(12) United States Patent
Toda et al.

(10) Patent No.: US 6,802,990 B2
(45) Date of Patent: Oct. 12, 2004

(54) FLUORESCENT SUBSTANCES FOR VACUUM ULTRAVIOLET RADIATION EXCITED LIGHT-EMITTING DEVICES

(76) Inventors: Kenji Toda, 2-12-5, Igarashinakajima, Niigata-shi, Niigata (JP); Mineo Sato, 7793-12, Igarashiichino-machi, Niigata-shi, Niigata (JP); Keiji Ono, 2-13-10-403, Amakubo, Tsukuba-shi, Ibaraki (JP); Susumu Miyazaki, 1622-61, Sakuragaoka, Fujishiro-cho, Kitasoma-gun, Ibaraki (JP); Takashi Takeda, 2-40-1-509, Kasuga, Tsukuba-shi, Ibaraki (JP)

( * ) Notice: Subject to any disclaimer, the term of this patent is extended or adjusted under 35 U.S.C. 154(b) by 61 days.

(21) Appl. No.: 09/960,955

(22) Filed: Sep. 25, 2001

(65) Prior Publication Data

US 2002/0038861 A1 Apr. 4, 2002

(30) Foreign Application Priority Data

Sep. 29, 2000 (JP) ........................................ 2000-299320
Mar. 9, 2001 (JP) ........................................ 2001-066318

(51) Int. Cl.$^7$ .......................... C09K 11/59; C09K 11/55
(52) U.S. Cl. ........................... 252/301.4 F; 252/301.6 F
(58) Field of Search ..................... 252/301.4 F, 301.6 F

(56) References Cited

U.S. PATENT DOCUMENTS

| | | | | |
|---|---|---|---|---|
| 2,601,032 A | * | 6/1952 | Larach | 252/301.6 F |
| 3,544,481 A | * | 12/1970 | Barry | 252/301.4 F |
| 3,651,363 A | * | 3/1972 | Barry | 313/486 |
| 3,676,361 A | * | 7/1972 | Datta | 252/301.4 F |
| 5,839,718 A | | 11/1998 | Hase et al. | |
| 6,284,156 B1 | | 9/2001 | Uehara et al. | |

FOREIGN PATENT DOCUMENTS

| | | |
|---|---|---|
| EP | 0 877 070 A1 | 11/1998 |
| JP | 52-8994 | * 1/1977 |

OTHER PUBLICATIONS

T. Kunimoto et al., "Blue and red emitting Eu activated CaMgSi2O6 phosphors for VUV", Extended Abstracts, The 6th International Conference on the Science and Technology of Display Phosphors, Society for Information Display, Nov. 2000, pp. 21–23.

Kikitani et al., "Synthesis of Solid Solutions Based on the Akermanite and/or Hardystnite Systems and Their Fluorescence Properties", Jpn. J. Appl. Phys., vol. 36, Part 1, No. 11, XP–002257833, Nov. 1997, pp. 6793–6797.

Abstract, Database Inspec/IEE, Stevenage, GB; 1997, Mausbach et al., "Infrared emission spectra (FTIR) and crystallization studies of the glassy Ca0.Mg0.2Si)/sub 2/–slag (900–1200 degrees C)", Database accession no. 5770750, XP–002257834.

* cited by examiner

Primary Examiner—C. Melissa Koslow

(57) ABSTRACT

A fluorescent substance for vacuum ultraviolet radiation excited light-emitting devices which emits light with a high luminance and is subject to only a small decrease in luminance due to exposure to plasma or the like, and a vacuum ultraviolet radiation excited light-emitting device including the fluorescent substance are provided. The fluorescent substance is represented by the general formula: $mM^1O \cdot nM^2O \cdot 2M^3O_2$, wherein $M^1$ is at least one metal selected from the group consisting of Ca, Sr and Ba, $M^2$ is at least one metal selected from the group consisting of Mg and Zn, $M^3$ is at least one metal selected from the group consisting of Si and Ge, and m and n satisfy $0.5 \leq m \leq 3.5$ and $0.5 \leq n \leq 2.5$, respectively. Either Eu and Mn can be used as an activator.

15 Claims, No Drawings

FLUORESCENT SUBSTANCES FOR VACUUM ULTRAVIOLET RADIATION EXCITED LIGHT-EMITTING DEVICES

FIELD OF THE INVENTION

The present invention relates to fluorescent substances, especially suitably used for vacuum ultraviolet radiation excited light-emitting devices such as plasma display panels (hereinafter referred to as "PDPs") and rare gas lamps.

BACKGROUND OF THE INVENTION

Fluorescent substances that emit light when excited with vacuum ultraviolet radiation or the like include, for example, $BaMgAl_{10}O_{17}$:Eu comprising Ba, Mg, Al, O and an activator (Eu) as a blue fluorescent substance for vacuum ultraviolet radiation excited light-emitting devices, and $Zn_2SiO_4$:Mn comprising Zn, Si, O and an activator (Mn) as a green fluorescent substance. As well, $(Y,Gd)BO_3$:Eu comprising Y, Gd, B, O and an activator (Eu), for example, has been known as a red fluorescent substance. Such fluorescent substances are also used in rare gas lamps. These prior art fluorescent substances for vacuum ultraviolet radiation excited light-emitting devices, however, are desired to exhibit further enhanced luminance.

In vacuum ultraviolet radiation excited light-emitting devices such as PDPs and rare gas lamps, causing discharge in a rare gas generates plasma and then, vacuum ultraviolet radiation is generated. The prior art fluorescent substances involve a problem that the luminance thereof decreases as they are exposed to plasma. Thus, there is a desire for a fluorescent substance for vacuum ultraviolet radiation excited light-emitting devices of which luminance does not much decrease due to exposure to plasma.

U.S. Pat. No. 5,839,718 discloses a silicate fluorescent substance comprising a compound represented by the general formula: $m(Sr_{1-a}M^1{}_a)O \cdot n(Mg_{1-b}M^2{}_b)O \cdot 2(Si_{1-c}Ge_c)O_2$:$Eu_xLn_y$, wherein $M^1$ is Ba, $M^2$ is at least one element selected from the group consisting of Be, Zn and Cd, Ln is at least one element selected from the group consisting of Sc, Y, La, Ce, Pr, Nd, Sm, Gd, Tb, Dy, Ho, Er, Tm, Yb, Lu, B, Al, Ga, In, Tl, Sb, Bi, As, P, Sn, Pb, Ti, Zr, Hf, V, Nb, Ta, Mo, W, Cr and Mn. Specific examples of such silicate fluorescent substances disclosed include $Sr_{1.995}MgSi_2O_7$:$Eu_{0.005}$, $Dy_{0.025}$, $Cl_{0.025}$, and $Sr_{0.445}Ba_{1.55}MgSi_2O_7$:$Eu_{0.005}$, $Dy_{0.025}$, $Cl_{0.025}$. These fluorescent substances are for use as light accumulators for display in dark places or for similar purposes. "Extended abstracts of the sixth international conference on the science and technology of display phosphors", pages 21–24, discloses $CaMgSi_2O_6$:Eu as a fluorescent substance for vacuum ultraviolet radiation excited light-emitting devices.

Such fluorescent substances comprising silicate still have the problem that their luminance is insufficient and decreases due to exposure to plasma.

It is an object of the present invention to provide a fluorescent substance for vacuum ultraviolet radiation excited light-emitting devices which emits light with a higher luminance and a small decrease in luminance after the exposure to plasma.

SUMMARY OF THE INVENTION

Under such circumstances, the inventors of the present invention have made an intensive and continuous study in pursuit of resolving the foregoing problems and, as a result, have found that, among silicate or germanate fluorescent substances for vacuum ultraviolet radiation excited light-emitting devices, a fluorescent substance having a specific composition comprising: a compound represented by the general formula, $mM^1O \cdot nM^2O \cdot 2M^3O_2$, wherein $M^1$ is at least one metal selected from the group consisting of Ca, Sr and Ba, $M^2$ is at least one metal selected from the group consisting of Mg and Zn, $M^3$ is at least one metal selected from the group consisting of Si and Ge, and m and n satisfy $0.5 \leq m \leq 3.5$ and $0.5 \leq n \leq 2.5$, respectively, provided that when m=n=1, $M^1$ is either at least two metals selected from the group consisting of Ca, Sr and Ba, or one of Sr and Ba; and either one of Eu or Mn as an activator, emits light with a higher luminance and a smaller decrease in luminance after the exposure to plasma. Thus, the present invention has been completed.

Accordingly, the present invention provides a fluorescent substance for vacuum ultraviolet radiation excited light-emitting devices, comprising: a compound represented by the general formula, $mM^1O \cdot nM^2O \cdot 2M^3O_2$, wherein $M^1$ is at least one metal selected from the group consisting of Ca, Sr and Ba, $M^2$ is at least one metal selected from the group consisting of Mg and Zn, $M^3$ is at least one metal selected from the group consisting of Si and Ge, and m and n satisfy $0.5 \leq m \leq 3.5$ and $0.5 \leq n \leq 2.5$, respectively, provided that when m=n=1, $M^1$ is either at least two metals selected from the group consisting of Ca, Sr and Ba, or one of Sr and Ba; and either one of Eu or Mn as an activator. The present invention also provides a vacuum ultraviolet radiation excited light-emitting device comprising the fluorescent substance defined above.

DETAILED DESCRIPTION OF THE INVENTION

The fluorescent substance for vacuum ultraviolet radiation excited light-emitting devices according to the present invention is characterized by comprising: a base crystal formed of a compound represented by the general formula: $mM^1O \cdot nM^2O \cdot 2M^3O_2$, wherein $M^1$ is at least one metal selected from the group consisting of Ca, Sr and Ba, $M^2$ is at least one metal selected from the group consisting of Mg and Zn, $M^3$ is at least one metal selected from the group consisting of Si and Ge, and m and n satisfy $0.5 \leq m \leq 3.5$ and $0.5 \leq n \leq 2.5$, respectively, provided that when m=n=1, $M^1$ is either at least two metals selected from the group consisting of Ca, Sr and Ba, or one of Sr and Ba; and either one of Eu or Mn as an activator.

When m=n=1 in the above-noted general formula, $M^1$ is selected from the group consisting of Sr, Ba, the combination of Sr, Ba and Ca, combination of Sr and Ca, combination of Ba and Sr, and combination of Ba and Ca.

Preferably, the fluorescent substance for vacuum ultraviolet radiation excited light-emitting devices according to the present invention has a crystal structure as same as diopside, akermanite, or merwinite.

Among fluorescent substances having the same crystal structure as diopside, one comprising a compound of the above-noted general formula where m=n=1 is preferable. A more preferable one as a fluorescent substance for vacuum ultraviolet radiation excited light-emitting devices is of a composition in which $M^1$ is partially replaced with the activators Eu, or $M^2$ is partially replaced with the activators Mn, and which is represented by the general formula: $(M^1{}_{1-a}Eu_a)M^2M^3{}_2O_6$ or $M^1(M^2{}_{1-b}Mn_b)M^3{}_2O_6$, wherein $M^1$ is either at least two metals selected from the group consisting of Ca, Sr and Ba, or one of Sr and a, $M^2$ is at least one metal selected from the group consisting of Mg and Zn, $M^3$ is at least one metal selected from the group consisting of Si and Ge, and a and b satisfy $0 \leq a \leq 0.5$ and $0 \leq b \leq 0.5$, respectively.

A still preferred one of fluorescent substances having the same crystal structure as diopside and comprising a compound of the above-noted general formula where m=n=1 has a composition in which $M^1$ is Ca and Sr, $M^2$ and $M^3$ are Mg and Si, respectively, and Ca is partially replaced with the activator Eu and which is represented by the general formula: $Ca_{1-c}Sr_cEu_dMgSi_2O_6$, wherein c and d satisfy $0<c \leq 0.1$ and $0<d \leq 0.1$, respectively.

Among fluorescent substances having the same crystal structure as akermanite, one comprising a compound of the above-noted general formula where m=2 and n=1 is preferable. A more preferable one as a fluorescent substance for vacuum ultraviolet radiation excited light-emitting devices has a composition in which $M^1$ is partially replaced with the activators Eu, or $M^2$ is partially replaced with the activators Mn, respectively, and which is represented by the general formula: $(M^1_{1-e}Eu_e)_2M^2M^3_2O_7$ or $M^1_2(M^2_{1-f}Mn_f)M^3_2O_7$, wherein $M^1$ is at least one metal selected from the group consisting of Ca, Sr and Ba, $M^2$ is at least one metal selected from the group consisting of Mg and Zn, $M^3$ is at least one metal selected from the group consisting of Si and Ge, and e and f satisfy $0 \leq e > 0.5$ and $0 \leq f \leq 0.5$, respectively. Still more preferable is a fluorescent substance having a composition in which f=0, and $M^3$ is Si and which is represented by the general formula: $(M^1_{1-e}Eu_e)_2M^2 Si_2O_7$, wherein $M^1$ is at least one metal selected from the group consisting of Ca, Sr and Ba, $M^2$ is at least one metal selected from the group consisting of Mg and Zn, and e satisfies $0.001 \leq e \leq 0.1$.

Among fluorescent substances having the same crystal structure as akermanite, one comprising a compound of the above-noted general formula where m=1 and n=2 is preferable. A more preferable one as a fluorescent substance for vacuum ultraviolet radiation excited light-emitting devices has a composition in which $M^1$ is partially replaced with the activators Eu, or $M^2$ is partially replaced with the activators Mn, respectively, and which is represented by the general formula: $(M^1_{1-h}Eu_h)M^2_2M^3_2O_7$ or $M^1(M^2_{1-i}Mn_i)_2M^3_2O_7$, wherein M is at least one metal selected from the group consisting of Ca, Sr and Ba, $M^2$ is at least one metal selected from the group consisting of Mg and Zn, $M^3$ is at least one metal selected from the group consisting of Si and Ge, and h and i satisfy $0 \leq h \leq 0.5$ and $0 \leq i \leq 0.5$, respectively.

Among fluorescent substances having the same crystal structure as merwinite, one comprising a compound of the above-noted general formula where m=3 and n=1 is preferable. A more preferable one as a fluorescent substance for vacuum ultraviolet radiation excited light-emitting devices has a composition in which $M^1$ is partially replaced with the activators Eu, or $M^2$ is partially replaced with the activators Mn, respectively, and which is represented by the general formula: $(M^1_{1-j}Eu_j)_3M^2M^3_2O_8$ or $M^1_3(M^2_{1-k}Mn_k)M^3_2O_8$, wherein $M^1$ is at least one metal selected from the group consisting of Ca, Sr and Ba, $M^2$ is at least one metal selected from the group consisting of Mg and Zn, $M^3$ is at least one metal selected from the group consisting of Si and Ge, and j and k satisfy $0 \leq j \leq 0.5$ and $0 \leq k \leq 0.5$, respectively.

Among fluorescent substances having the same crystal structure as diopside, akermanite or merwinite, those having the same crystal structure as diopside and those having the same crystal structure as merwinite are preferable. Fluorescent substances having the same structure as diopside are particularly preferable.

Raw materials usable as calcium, strontium and barium sources in the preparation of the fluorescent substance of the present invention may be either those which can be decomposed into oxides at high temperatures such as hydroxides, carbonates, nitrates, halides, oxalates or the like of calcium, strontium and barium having high purity (99% or more), or oxides of calcium, strontium and barium having high purity (99.9% or more).

Raw materials usable as magnesium and zinc sources may be either those which can be decomposed into oxides at high temperatures such as hydroxides, carbonates, nitrates, halides, oxalates or the like of magnesium and zinc having high purity (99% or more), or oxides of magnesium and zinc having high purity (99% or more).

Raw materials usable as silicon and germanium sources may be either those which can be decomposed into oxides at high temperatures such as hydroxides, carbonates, nitrates, halides, oxalates or the like of silicon and germanium having high purity (99% or more), or oxides of silicon and germanium having high purity (99% or more).

Raw materials containing europium or manganese that will serve as an activator may be either those which can be decomposed into oxides at high temperatures such as hydroxides, carbonates, nitrates, halides, oxalates or the like of europium and manganese having high purity (99% or more), or oxides of europium and manganese having high purity (99% or more).

There is no particular limitation to the method of preparing the fluorescent substance of the present invention. The fluorescent substance may be prepared, for example, by mixing the aforementioned raw materials and calcining the mixture.

For instance, the fluorescent substance having the composition represented by the formula: $(M^1_{1-a}Eu_a)M^2M^3_2O_6$, which is one of the preferable compositions described above, can be prepared by weighing and blending the foregoing raw materials into a predetermined composition, mixing them and calcining the mixture. In mixing such raw materials, it is possible to use a ball mill, V-Type mixer, stirring device or the like.

After the mixing, the mixture is calcined at a temperature, for example, ranging between about 1000° C. and about 1500° C. for about 1 to about 100 hours, to give the fluorescent substance of the present invention. In the case where those raw materials which can be decomposed into oxides at high temperatures such as hydroxides, carbonates, nitrates, halides, oxalates or the like of the necessary elements are used, it is possible to conduct pre-calcination of the mixture at a temperature, for example, ranging between about 600° C. and about 900° C. prior to the main-calcination.

There is no particular limitation to the calcining atmosphere, but calcining in a reducing atmosphere comprising, for example, nitrogen, argon or the like and hydrogen in an amount of 10% by volume is preferable. The pre-calcination may be performed either in atmospheric air or in a reducing atmosphere. To promote the calcining reaction, an appropriate amount of a flux may be added.

Further, the fluorescent substance obtained by the above-described method may be pulverized using, for example, a ball mill, jet mill or the like. Further, the substance may be washed and classified. To obtain a fluorescent substance of higher crystallinity, re-calcination may be performed.

The fluorescent substance of the present invention thus obtained is capable of emitting light with a high luminance when excited with vacuum ultraviolet radiation and exhibits only a small decrease in luminance due to exposure to plasma. In the manufacture of a PDP, rare gas lamp or the like, a process typically includes dispersing the fluorescent substance in a solvent, adding a binder to the dispersion liquid, applying the dispersion liquid onto alight-emitting section, and heating the dispersion liquid thus applied to about 500° C. to remove the binder. The fluorescent substance of the present invention, even if subjected to such a process, exhibits only a small decrease in luminance due to the heat treatment. Accordingly, use of the fluorescent substance of the present invention in a vacuum ultraviolet radiation excited light-emitting device such as PDP or rare gas lamp makes it possible to realize a PDP or rare gas lamp exhibiting a high luminance and a prolonged service life. Hence, the fluorescent substance of the present invention is suitable for vacuum ultraviolet radiation excited light-emitting devices.

The fluorescent substance of the present invention can also be excited with ultraviolet radiation out of the vacuum ultraviolet region, X-rays, electron beam or the like and hence may be employed in devices using ultraviolet radiation out of the vacuum ultraviolet region, X-rays or electron beam as an excitation source.

EXAMPLES

The present invention is in more detailed with reference to the following examples, but the invention is not limited to those examples.

Example 1

Raw materials, namely, calcium carbonate ($CaCO_3$ produced by WAKOJUNYAKU CO., LTD.), strontium carbonate ($SrCO_3$ produced by WAKOJUNYAKU CO., LTD.), europium oxide ($Eu_2O_3$ produced by SHINETSU KAGAKUKOGYO CO., LTD.), basic magnesium carbonate (($MgCO_3)_4Mg(OH)_2 \cdot 5H_2O$ produced by WAKOJUNYAKU CO., LTD.) and silicon oxide ($SiO_2$ produced by WAKOJUNYAKU CO., LTD.), were weighed and mixed together so that the molar ratio of $CaCO_3:SrCO_3:Eu_2O_3:((MgCO_3)_4Mg(OH)_2 \cdot 5H_2O:SiO_2$ was 0.9215:0.0485:0.015:0.2:2. The resulting mixture was calcined at 1200° C. for two hours in a stream of Ar gas containing $H_2$ in an amount of 2% by volume, then ground, and again calcined at 1200° C. for two hours in a stream of Ar gas containing $H_2$ in an amount of 2% by volume. A fluorescent substance of a composition represented by the formula: $Ca_{0.9215}Sr_{0.485}Eu_{0.03}MgSi_2O_6$ was thus obtained. When this fluorescent substance was irradiated with ultraviolet radiation using an excimer 146-nm lamp (Model: H0012 manufactured by USHIO DENKI CO.) in a vacuum chamber under a pressure of 6.7 Pa ($5 \times 10^{-2}$ Torr) or lower, it emitted blue light with a luminance of 24 $cd/m^2$.

The fluorescent substance thus obtained was subjected to a heat treatment at 500° C. for 30 minutes in air. The fluorescent substance having undergone the heat treatment was measured for its luminance and, as a result, there was no decrease in luminance as compared with the luminance of the fluorescent substance before the heat treatment.

The fluorescent substance obtained was placed in a gas atmosphere having a Xe Ne composition ratio of 5% 95% by volume under a pressure of 13.2 Pa and exposed to plasma of 10 W for 30 minutes, then to plasma of 50 W for 15 minutes. After the exposure to plasma, the fluorescent substance was measured for its luminance and, as a result, there was no decrease in luminance as compared with the luminance of the fluorescent substance before the exposure to plasma.

The fluorescent substance obtained was subjected to a heat treatment at 500° C. for 30 minutes in air. Subsequently, the fluorescent substance was placed in a gas atmosphere having a Xe Ne composition ratio of 5% 95% by volume under a pressure of 13.2 Pa and exposed to plasma of 10 W for 30 minutes, then to plasma of 50 W for 15 minutes. After the exposure to plasma, the fluorescent substance was measured for its luminance and, as a result, there was a decrease as small as 4% in luminance as compared with the luminance of the fluorescent substance before the heat treatment and the exposure to plasma.

Example 2

Raw materials, namely, strontium carbonate ($SrCO_3$ produced by WAKOJUNYAKU CO, LTD.), barium carbonate ($BaCO_3$ produced by WAKOJUNYAKU CO, LTD.), europium oxide ($Eu_2O_3$ produced by SHINETSU KAGAKUKOGYO CO., LTD.), basic magnesium carbonate (($MgCO_3)_4Mg(OH)_2 \cdot 5H_2O$ produced by WAKOJUNYAKU CO., LTD.) and silicon oxide ($SiO_2$ produced by WAKOJUNYAKU CO., LTD.), were weighed and mixed together so that the molar ratio of $SrCO_3:BaCO_3:Eu_2O_3:(MgCO_3)_4Mg(OH)_2 \cdot 5H_2O:SiO_2$ was 2.28:0.57:0.075:0.2:2. The resulting mixture was calcined at 1200° C. for two hours in a stream of Ar gas containing $H_2$ in an amount of 2% by volume. A fluorescent substance having a composition represented by the formula: $Sr_{2.28}Ba_{0.57}Eu_{0.15}MgSi_2O_8$ was thus obtained. When this fluorescent substance was irradiated with ultraviolet radiation using an excimer 146-nm lamp (Model: H0012 manufactured by USHIO DENKI CO.) in a vacuum chamber under a pressure of 6.7 Pa ($5 \times 10^{-2}$ Torr) or lower, it emitted blue light with a luminance of 30 $cd/m^2$.

Example 3

Raw materials, namely, barium carbonate ($BaCO_3$ produced by KANTOKAGAKU CO, LTD.), europium oxide ($EU_2O_3$ produced by SHINETSU KAGAKUKOGYO CO., LTD.), magnesium oxide (MgO produced by KANTOKAGAKU CO., LTD.) and silicon oxide ($SiO_2$ produced by KOJUNDOKAGAKU KENKYUSHO CO., LTD.), were weighed and mixed together so that the molar ratio of $BaCO_3:Eu_2O_3:MgO:SiO_2$ was 1.98:0.01:1:2. 0.1 mol of $B_2O_3$ as a flux was added relative to 1 mol of the product, and the resulting mixture was sufficiently wet-blended in acetone with mortar, followed by drying. The mixed raw material thus obtained was put into a stainless steel mold and then pressurized at 40 Mpa to form a circular pellet having a size of 15 mm (diameter)×3 mm (thickness). The resulting pellet was put into an alumina crucible and calcined at 1200° C. for three hours in an atmosphere having a $H_2$ Ar composition ratio of 5% 95% by volume. A fluorescent substance having a composition represented by the formula: $Ba_{1.98}Eu_{0.02}MgSi_2O_7$ was thus obtained. When this fluorescent substance was irradiated with ultraviolet radiation using an excimer 146-nm lamp (Model: H0012 manufactured by USHIO DENKI CO.) in a vacuum chamber under a pressure of 6.7 Pa ($5 \times 10^{-2}$ Torr) or lower, it emitted green light with a luminance of 95 $cd/m^2$.

Example 4

Used as starting materials for the preparation of $(Sr_{0.99}Eu_{0.01})_2MgSi_2O_7$ were strontium carbonate ($SrCO_3$ produced by KANTOKAGAKU CO, LTD.), europium oxide ($Eu_2O_3$ produced by SHINETSU KAGAKUKOGYO CO., LTD.), magnesium oxide (MgO produced by KAN- TOKAGAKU CO., LTD.) and silicon oxide ($SiO_2$ produced by KOJUNDOKAGAKU KENKYUSHO CO., LTD.). These materials were weighed and mixed together so that the molar ratio of $SrCO_3:Eu_2O_3:MgO:SiO_2$ was 1.98:0.01:1:2, then 0.1 mol of $B_2O_3$ as a flux was added relative to 1 mol of the product, i.e., $(Sr_{0.99}Eu_{0.01})_2MgSi_2O_7$, and the resulting mixture was sufficiently wet-blended in acetone with mortar, followed by drying. The mixed raw material thus obtained was put into a stainless steel mold and then pressurized at 40 Mpa to form a circular pellet having a size of 15 mm (diameter)×3 mm (thickness). The resulting pellet was put into an alumina crucible and calcined at 1200° C. for three hours in an atmosphere having a $H_2$ Ar composition ratio of 5% 95%. When the sample resulting from the calcining was irradiated with ultraviolet radiation having a wavelength of 254 nm or 365 nm, it emitted light blue light with a high luminance in either case. When the sample was irradiated with ultraviolet radiation using an excimer 146-nm lamp (manufactured by USHIO DENKI CO.) in a vacuum chamber under a pressure of 6.7 Pa ($5\times10^{-2}$ Torr) or lower, it emitted intensive light blue light with a luminance of 25 $cd/m^2$.

Example 5

Used as starting materials for the preparation of $(Sr_{0.99}Eu_{0.01})_2ZnSi_2O_7$ were strontium carbonate ($SrCO_3$), europium oxide ($Eu_2O_3$), zinc oxide (ZnO) and silicon oxide ($SiO_2$). These materials were weighed and mixed together so that the molar ratio of $SrCO_3$: $EU_2O_3$: ZnO: $SiO_2$ was 1.98:0.01:1:2, then 0.1 mol of $B_2O_3$ as a flux was added relative to 1 mol of the product, i.e., $(Sr_{0.99}Eu_{0.01})_2ZnSi_2O_7$, and the resulting mixture was sufficiently wet-blended in acetone with mortar, followed by drying. The mixed raw material thus obtained was put into a stainless steel mold and then pressurized at 40 Mpa to form a circular pellet having a size of 15 mm (diameter)×3 mm (thickness). The resulting pellet was put into an alumina crucible and calcined at 1200° C. for three hours in an atmosphere having a $H_2$ Ar composition ratio of 5% 95%. When the sample resulting from the calcining was irradiated with ultraviolet radiation having a wavelength of 254 nm or 365 nm, it emitted bluish green light with a high luminance.

Comparative Example 1

Raw materials, namely, calcium carbonate ($CaCO_3$ produced by WAKOJUNYAKU CO, LTD.), europium oxide ($Eu_2O_3$ produced by SHINETSU KAGAKUKOGYO CO., LTD.), basic magnesium carbonate $((MgCO_3)_4Mg(OH)_2 \cdot 5H_2O$ produced by WAKOJUNYAKU CO., LTD.) and silicon oxide ($SiO_2$ produced by WAKOJUNYAKU CO., LTD.), were weighed and mixed together so that the molar ratio of $CaCO_3:Eu_2O_3:(MgCO_3)_4Mg(OH)_2 \cdot 5H_2O:SiO_2$ was 0.95:0.025:0.2:2. The resulting mixture was calcined at 1200° C. for two hours in a stream of Ar gas containing $H_2$ in an amount of 2% by volume. A fluorescent substance having a composition represented by the formula: $Ca_{0.95}Eu_{0.05}MgSi_2O_6$ was thus obtained. When this fluorescent substance was irradiated with ultraviolet radiation using an excimer 146-nm lamp (Model: H0012 manufactured by USHIO DENKI CO.) in a vacuum chamber under a pressure of 6.7 Pa ($5\times10^{-2}$ Torr) or lower, it emitted blue light with a luminance of 12 $cd/m^2$.

Comparative Example 2

A commercially-available blue light emitting fluorescent substance ($BaMgAl_{10}O_{17}$:Eu) was subjected to a heat treatment at 500° C. for 30 minutes in air. The fluorescent substance having undergone the heat treatment was measured for its luminance and, as a result, there was a 1% decrease in luminance as compared with the luminance of the fluorescent substance before the heat treatment.

The commercially-available blue light emitting fluorescent substance ($BaMgAl_{10}O_{17}$:Eu) was placed in a gas atmosphere having a Xe Ne composition ratio of 5% 95% by volume under a pressure of 13.2 Pa and exposed to plasma of 10 W for 30 minutes, then to plasma of 50 W for 15 minutes. After the exposure to plasma, the fluorescent substance was measured for its luminance and, as a result, there was a 25% decrease in luminance as compared with the luminance of the fluorescent substance before the exposure to plasma.

The commercially-available blue light emitting fluorescent substance ($BaMgAl_{10}O_{17}$:Eu) was subjected to a heat treatment at 500° C. for 30 minutes in air. Subsequently, the fluorescent substance was placed in a gas atmosphere having a Xe Ne composition ratio of 5% 95% by volume under a pressure of 13.2 Pa and exposed to plasma of 10 W for 30 minutes, then to plasma of 50 W for 15 minutes. After the exposure to plasma. the fluorescent substance removed from the gas atmosphere was measured for its luminance and, as a result, there was a 28% decrease in luminance as compared with the luminance of the fluorescent substance in a state before undergoing the heat treatment and the exposure to plasma.

The fluorescent substance of the present invention emits light with a high luminance and exhibits only a small decrease in luminance due to exposure to plasma and, hence, is particularly suitable for use in vacuum ultraviolet radiation excited light-emitting devices such as PDPs and rare gas lamps. Since the fluorescent substance makes it possible to realize vacuum ultraviolet radiation excited light-emitting devices exhibiting high luminance, it is highly useful for industry.

What is claimed is:

1. A fluorescent substance for vacuum ultraviolet radiation excite light-emitting devices comprising: a compound represented by the general formula, $mM^1O \cdot nM^2O \cdot 2M^3O_2$, wherein $M^1$ is Ca and Sr, $M^2$ is at least one metal selected from the group consisting of Mg and Zn, $M^3$ is at least one metal selected from the group consisting of Si and Ge, and m and n satisfy $0.5 \leq m \leq 1.5$ and $0.5 \leq n \leq 2.5$, respectively; and at least one metal selected from the group consisting of Eu and Mn as an activator.

2. The fluorescent substance for vacuum ultraviolet radiation excited light-emitting devices according to claim 1, wherein said fluorescent substance has the same crystal structure as diopside.

3. The fluorescent substance for vacuum ultraviolet radiation excited light-emitting devices according to claim 2, wherein m=n=1 in the general formula.

4. The fluorescent substance for vacuum ultraviolet radiation excited light-emitting devices according to claim 2, wherein $M^1$ is Ca and Sr, and $M^2$ and $M^3$ are Mg and Si, respectively in the general formula, and the activator is Eu.

5. The fluorescent substance for vacuum ultraviolet radiation excited light-emitting devices according to claim 4, wherein said fluorescent substance is of a composition represented by the formula: $Ca_{1-c-d}Sr_cEu_dMgSi_2O_6$, wherein c and d $0<c \leq 0.1$ and $0<d \leq 0.1$, respectively.

6. The fluorescent substance for vacuum ultraviolet radiation excited light-emitting devices according to claim 1, wherein said fluorescent substance has the same crystal structure as akermanite.

7. The fluorescent substance for vacuum ultraviolet radiation excited light-emitting devices according to claim 6, wherein $M^3$ is Si in the general formula, and the activator is Eu.

8. The fluorescent substance for vacuum ultraviolet radiation excited light-emitting devices according to claim 6, wherein m=1 and n=2 in the general formula.

9. The fluorescent substance for vacuum ultraviolet radiation excited light-emitting devices according to claim 1, wherein said fluorescent substance has the same crystal structure as merwinite.

10. A fluorescent substance for vacuum ultraviolet radiation excited light-emitting devices comprising: a compound represented by the general formula, $mM^1O \cdot nM^2O \cdot 2M^3O_2$, wherein $M^1$ is Ca and Sr, $M^2$ is at least one metal selected from the group consisting of Mg and Zn, $M^3$ is at least one metal selected from the group consisting of Si and Ge, and m and n satisfy $0.5 \leq m < 2$ and $0.5 \leq n \leq 2.5$, respectively; and at least one metal selected from the group consisting of Eu and Mn as an activator.

11. A vacuum ultraviolet radiation excited light-emitting device comprising a fluorescent substance for vacuum ultraviolet radiation excited light-emitting devices, said fluorescent substance comprising: a compound represented by the general formula, $mM^1O \cdot nM^2O \cdot 2M^3O_2$, wherein $M^1$ is Ca and Sr, $M^2$ is at least one metal selected from the group consisting of Mg and Zn, $M^3$ is at least one metal selected from the group consisting of Si and Ge, and m and n satisfy $0.5 \leq m \leq 3.5$ and $0.5 \leq n \leq 2.5$, respectively; and at least two metals selected from the group consisting of Eu and Mn as an activator.

12. The vacuum ultraviolet radiation excited light-emitting device according to claim 11, wherein the fluorescent substance for vacuum ultraviolet radiation excited light-emitting devices has the same crystal structure as diopside.

13. The vacuum ultraviolet radiation excited light-emitting device according to claim 12, wherein m=n=1 in the general formula.

14. The vacuum ultraviolet radiation excited light-emitting device according to claim 12, wherein $M^1$ is Ca and Sr, and $M^2$ and $M^3$ are Mg and Si, respectively in the general formula, and the activator is Eu.

15. The vacuum ultraviolet radiation excited light-emitting device according to claim 14, wherein the fluorescent substance for vacuum ultraviolet radiation excited light-emitting devices is of a composition represented by the formula: $Ca_{1-c-d}Sr_cEu_dMgSi_2O_6$, wherein c and d satisfy $0 < c \leq 0.1$ and $0 < d \leq 0.1$, respectively.

* * * * *

UNITED STATES PATENT AND TRADEMARK OFFICE
CERTIFICATE OF CORRECTION

PATENT NO. : 6,802,990 B2
DATED : October 12, 2004
INVENTOR(S) : Kenji Toda et al.

It is certified that error appears in the above-identified patent and that said Letters Patent is hereby corrected as shown below:

<u>Title page,</u>
Item [73], Assignees, should be -- SUMITOMO CHEMICAL COMPANY, LIMITED --

Signed and Sealed this

Fifth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,802,990 B2  Page 1 of 1
APPLICATION NO. : 09/960955
DATED : October 12, 2004
INVENTOR(S) : Kenji Toda et al.

It is certified that error appears in the above-identified patent and that said Letters Patent is hereby corrected as shown below:

At line 47 of Column 5, please delete "$Ca_{0.9215}Sr_{0.485}Eu_{0.03}MgSi_2O_6$" and insert therefor --$Ca_{0.9215}Sr_{0.0485}Eu_{0.03}MgSi_2O_6$--.

Signed and Sealed this

Second Day of September, 2008

JON W. DUDAS
*Director of the United States Patent and Trademark Office*